Dec. 23, 1924. 1,520,416
P. E. HOLT
SPRING MOUNTED TRUCK ROLLER FOR TRACTORS
Filed Oct. 2, 1919
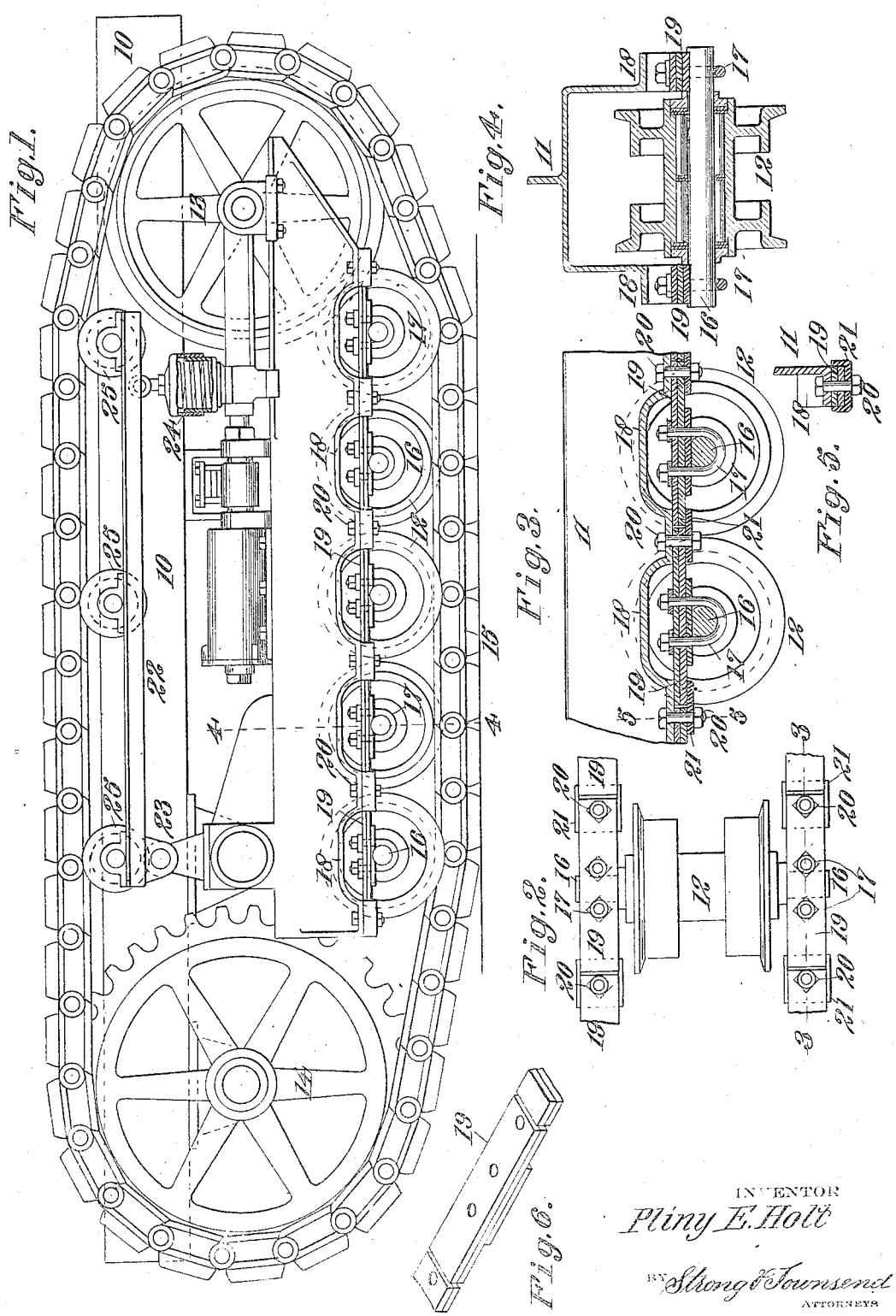
INVENTOR
Pliny E. Holt
BY Strong & Townsend
ATTORNEYS Patented Dec. 23, 1924.

1,520,416

UNITED STATES PATENT OFFICE.

PLINY E. HOLT, OF STOCKTON, CALIFORNIA, ASSIGNOR TO THE HOLT MANUFACTURING COMPANY, OF STOCKTON, CALIFORNIA, A CORPORATION OF CALIFORNIA.

SPRING-MOUNTED TRUCK ROLLER FOR TRACTORS.

Application filed October 2, 1919. Serial No. 327,950.

*To all whom it may concern:*

Be it known that I, PLINY E. HOLT, a citizen of the United States, residing at Stockton, in the county of San Joaquin and State of California, have invented new and useful Improvements in Spring-Mounted Truck Rollers for Tractors, of which the following is a specification.

This invention relates to tractors of the chain track type, and more particularly to a mounting for the supporting rollers of the truck mechanism. It has for its object to cushion the truck frame and thereby to relieve the main frame of the usual shocks and jars incident to the operation of the tractor. This is accomplished by providing cushioning means between the rollers and the truck frame.

In tractors of this type it has been the practice hitherto to cushion the main frame upon the truck frames. However, in the present invention I provide spring connections between the supporting rollers and the truck frames so that, if desired, the cushion springs between the truck frames and main frame may be omitted. This not only affords a cushioning action for the truck frames as well as the main frame, but also permits rigid connections to be used between the truck frames and the main frame. Also in this connection since the yielding of the supporting rollers upwardly in passing over irregularities in the ground is likely to produce some slack in the track, I provide a support for the upper run of the chain track, which support is spring pressed in a direction to maintain the track under constant tension, even when the supporting rollers are depressed.

Referring to the accompanying drawings:

Fig. 1 shows a side elevation of a tractor embodying my invention.

Fig. 2 shows a fragmentary plan view of one of the truck supporting rollers and its spring connection with the truck frame.

Fig. 3 shows a sectional view taken on the line 3—3 of Fig. 2.

Fig. 4 shows a sectional view taken on the line 4—4 of Fig. 1.

Fig. 5 shows a detail sectional view taken on the line 5—5 of Fig. 3.

Fig. 6 shows a fragmentary perspective view of the spring leaves or plates used in connecting the bearings of the truck rollers to the truck frame.

The tractor shown herewith is merely for the purpose of illustrating my invention and it comprises a main frame 10 at each side of which is a truck mechanism of the endless chain track type. This truck mechanism includes a truck frame 11, on which are journaled a series of supporting rollers 12. An idler sprocket wheel 13 is journaled on the forward end of the truck frame and a toothed driving sprocket wheel 14 is journaled directly on the main frame. A chain track 15 driven by the sprocket wheel 14 and guided at its forward portion by the idler wheel 13 forms a track for the rollers 12. The supporting connection between each truck frame 11 and the main frame 10 may be of any desired form, but preferably so as to allow a free and independent rocking movement of the truck mechanisms.

In the past it has been usual to interpose springs between the truck frames and the main frame in order to cushion the latter. With the present invention such springs may, if desired, be omitted, on account of the yielding connections between the truck rollers and truck frame about to be described. Each roller 12 has a spindle 16 on which it is turnable. This spindle is held at opposite ends by means of a U-bolt or clip 17 connected to the adjacent side plate of the truck frame 11, it being understood that the truck frame 11 is made up of spaced side plates, as is usual in truck mechanisms of this type. Where the spindle connects with the side plate there is formed an arch 18 upwardly bowed, and spanning the base of said arch are spring plates 19 held in place on the bottom edge of the side plates of the truck frame by means of bolts or fasteners 20. These spring plates 19 receive the U-bolts 17 and the spindle 16 presses upwardly against them. One end only of the spring plates 19 is fastened immovably to the truck frame by means of the bolts 20, the opposite end being held by a band or clip 21 which permits the spring plates to yield sufficiently to absorb the shocks and jolts of the roller in operation.

It will be seen that each roller is independently supported and is free to yield independently of the others. Therefore as the ground run of the chain track meets with irregularities in the surface of the roadway the rollers will be pressed upwardly against the spring plates and permit the chain track to conform to the contour of the ground. Since the supporting rollers are generally carried in a plane below a straight line drawn between the sprocket wheels over which the track operates, it will be seen that depressing of these rollers will allow some slack to occur in the track and to overcome this and to provide a more satisfactory support for the upper run of the chain track I have arranged a longitudinally extending bar 22 pivoted near its rear end, as shown at 23, upon the truck frame and freely movable at its forward end under the action of an extensible coiled spring 24. This bar 22 carries a series of small rollers 25, on which the upper run of the chain track is supported. Due to the influence of the spring 24, which is kept normally compressed, any slack occurring in the chain track will be taken up by the rising of the bar 22.

Various changes in the construction, combination and arrangement of parts may be resorted to without departing from the spirit of my invention as disclosed in the appended claim.

It will be noted that in the present structure the springs constitute the sole connection between the rollers and the truck frame for transmitting both the weight of the load and draft strains which occur between the truck frame and rollers. The arrangement is one of extreme simplicity and all strains of whatever character are transmitted through the springs themselves as the sole connecting means. The front ends of the springs are connected with the truck frames so that the normal draft strains are transmitted as tension strains in the spring, while the load strains are transmitted as transverse strains in the springs. This is advantageous because of the obvious engineering advantages secured thereby, for in handling heavy structures it is desirable to transmit the strains through bodies, such as these springs, by a pulling rather than a pushing operation.

Having thus described my invention, what I claim and desire to secure by Letters Patent is:

In a tractor truck mechanism of the chain track type, the combination with a truck frame having side plates formed with a series of arch-like recesses in the lower edges, of leaf springs spanning said recesses and connected with the side plates, a series of rollers for supporting the truck frame from the track, and journals for the rollers connected with the springs intermediate the ends of the latter.

In testimony whereof I have hereunto set my hand in the presence of two subscribing witnesses.

PLINY E. HOLT.

Witnesses:
 DAVID B. LYMAN,
 P. EHREFELD.